Patented July 15, 1924.

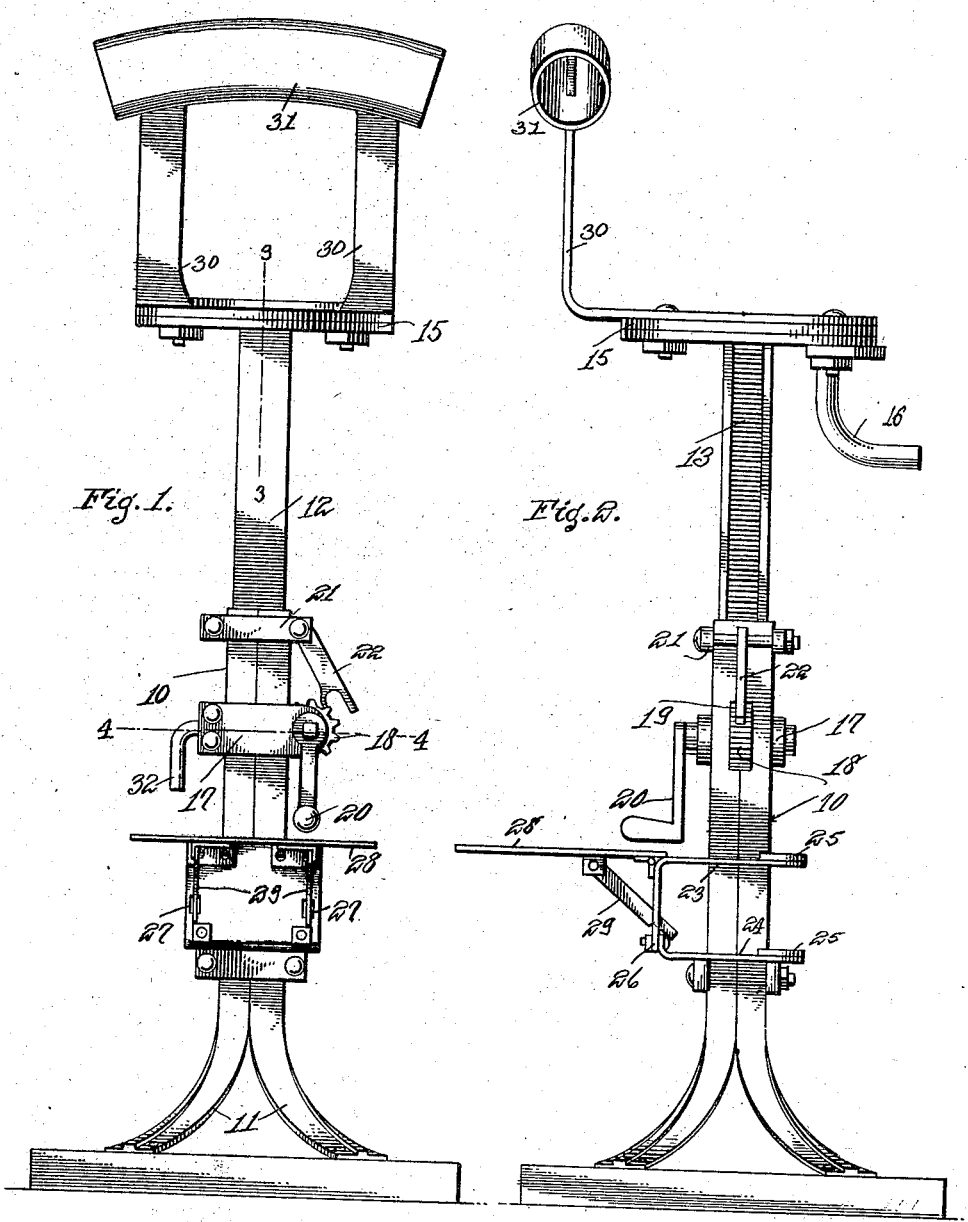

1,501,469

UNITED STATES PATENT OFFICE.

HOWARD B. REX, OF HENRYETTA, OKLAHOMA.

TIRE-REPAIR STAND.

Application filed March 12, 1923. Serial No. 624,684.

*To all whom it may concern:*

Be it known that I, HOWARD B. REX, a citizen of the United States, residing at Henryetta, in the county of Okmulgee, State of Oklahoma, have invented certain new and useful Improvements in Tire-Repair Stands; and I do hereby declare the following to be a full, clear, and exact description of the invention, such as will enable others skilled in the art to which it appertains to make and use the same.

This invention relates to new and useful improvements in repair stands, and particularly to stands especially adapted for use in repairing pneumatic tires.

One object of the invention is to provide a device of this character by means of which both inside and outside repairs may be made on the outer casing of a pneumatic tire.

Another object is to provide a device of this character which is readily and easily adjustable to accommodate tires of different sizes.

Other objects and advantages will be apparent from the following description when taken in connection with the accompanying drawing.

In the drawing:

Figure 1 is a front elevation of a repair stand made in accordance with the invention.

Figure 2 is a side elevation of the same.

Figure 3:
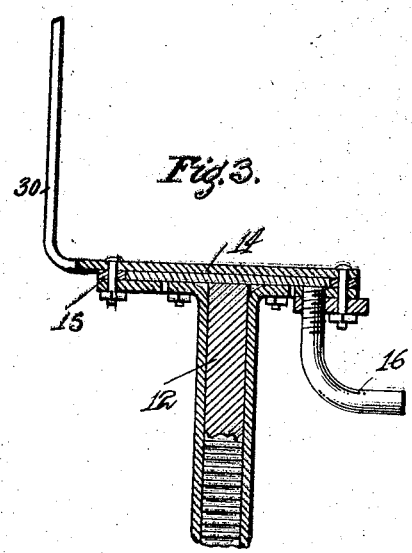
Figure 3 is a vertical longitudinal central sectional view on the line 3—3 of Figure 1.
Figure 4:
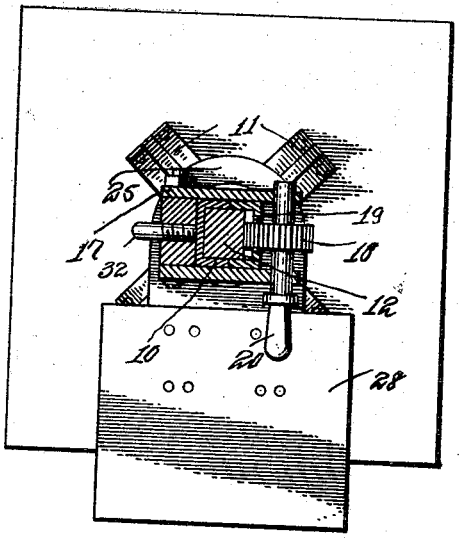
Figure 4 is a horizontal sectional view on the line 4—4 of Figure 1.

Referring particularly to the accompanying drawing, 10 represents a hollow upright which has the floor attaching feet 11, the opening through the upright being preferably rectangular in cross section to receive slidably therein the correspondingly shaped stem 12. One side face of the stem 12 is formed with a longitudinal series of rack teeth 13, and on the upper end of the stem there is formed a transverse head 14. Rotatably supported on this head 14 is a turntable 15, said head being in the form of a disk, which is slidably embraced by the said turntable. Carried by the turntable, and arranged to be turned into biting engagement with the head 14, is a screw 16, which serves to maintain the table against rotation when once the table has been set in the desired position. Secured on the standard or upright 10, adjacent the upper end thereof, is a bracket 17, the arms of which extend beyond one face of the upright and rotatably support the gear 18. In this face of the upright there is formed a slot 19 through which a portion of the gear 18 extends for engagement with the rack teeth 13, as clearly seen in the drawing. One end of the shaft of the gear 18 is angular for engagement by the crank 20, and by means of which crank the gear may be rotated to cause the stem 12 to be elevated or lowered. Pivotally carried by a second bracket, which, as shown at 21, is mounted on the upright 10, above the bracket 17, is a pawl 22 which engages with the gear 18, to hold the stem at the desired elevation.

A pair of angle plates 23 and 24 are disposed below the bracket 17, and each has a clamping collar 25 engaged loosely around the upright 10. The main portions of the plates 23 and 24 extend horizontally from the upright and have their outer ends secured in overlapped position, as shown at 26, one of the said ends being vertically slotted, as shown at 27. Hinged to the upper portion of the outer end of the upper plate 23 is a platform 28, and carried by the platform are the notched bracing legs 29, which are disposed in the slots of the plate and engaging with the walls of the slots to hold the table elevated.

Carried by the edge of the turntable, and extending vertically therefrom, are the arms 30, and secured to and extending between the upper ends of these arms is an arcuate section of metal pipe 31, which is adapted to be inserted in the outer casing of a pneumatic tire, for the purpose of supporting and holding the tire in position while being worked upon. The platform 28 is adapted to support the lower portion of the tire, when the tire is thus engaged with the pipe 31, the stem 12 being adjusted upwardly or downwardly, as the case may be, to permit the tire to rest on the platform. Should it be desired to perform some work on the inner portion, or inside of the tire casing, this can be readily accomplished by disposing the portion to be worked upon on the platform.

The particular manner in which the platform 28 is mounted on the upright 10, permits the same to be swung around the upright into the desired position, to suit the desires of the operator, while the platform may be swung downwardly, to be out of the way when not needed.

The pipe section 31 is removable so that sections of different diameters may be substituted to accommodate tires of different sizes.

In the side of the upright 10, there is engaged a clamping screw 32 which bears against the stem 12 to hold the same against movement, after having been adjusted by the gear 18.

What is claimed is:

1. A tire repair stand including a support, a vertically adjustable stem carried by the support, a turntable on the stem, means on the turntable for supporting the outer casing of a tire, and means for supporting the depending portion of a tire.

2. A tire repair stand including an upright, a vertically adjustable stem in the upright, a turntable on the upper end of the stem, means on the turntable for disposition within the upper portion of an outer casing of a pneumatic tire, and a platform on the upright for supporting the lower portion of the tire casing so engaged with the turntable carried means.

3. A tire repair stand including a hollow upright, a rack toothed stem vertically adjustable within the upright, a turntable on the upper end of the stem, vertical arms on the turntable, a removable arcuate tubular member carried by the arms and arranged to be inserted within the upper portion of an outer casing of a pneumatic tire to permit work thereupon, and a platform on the upright, adjacent the lower end, for supporting the lower portion of the tire casing so engaged with the turntable carried means.

4. A tire repair stand including a hollow upright, a rack toothed stem vertically slidable therein, a gear supported on the upright and engaging with the rack, a pawl carried by the upright and engaging the gear, a turntable on the stem, vertical arms on the turntable, an arcuate member carried by the arms for supporting engagement within the outer casing of a tire, means on the turntable for engagement with the stem for locking the turntable against movement, at times, and a platform on the lower portion of the upright for supporting the lower portion of the tire which is so engaged on the arcuate member.

In testimony whereof, I affix my signature, in the presence of two witnesses.

HOWARD B. REX.

Witnesses:
W. L. DRAKE,
J. T. PORTER.